(No Model.)

T. L. KAUFFER & J. SERSON.
GALVANIC BATTERY.

No. 279,872. Patented June 19, 1883.

WITNESSES
John L. Simmons
Geo. J. Adams

INVENTORS
Theodor L. Kauffer
James Serson
by their atty
Wm. B. H. Dowse

UNITED STATES PATENT OFFICE.

THEODORE L. KAUFFER AND JAMES SERSON, OF BOSTON, MASSACHUSETTS; SAID KAUFFER ASSIGNOR OF PART INTEREST TO WILLIAM B. S. GAY, OF SAME PLACE.

GALVANIC BATTERY.

SPECIFICATION forming part of Letters Patent No. 279,872, dated June 19, 1883.

Application filed December 18, 1882. (No model.)

*To all whom it may concern:*

Be it known that we, THEODORE L. KAUFFER, a citizen of the United States, and JAMES SERSON, a subject of the Queen of Great Britain, both residing at Boston, in the county of Suffolk and Commonwealth of Massachusetts, have invented certain new and useful Improvements in Galvanic Batteries, of which the following is a specification.

Our invention relates especially to improvements in the mechanical construction of galvanic batteries; and it consists in producing a battery which gives an even and strong current of electricity for a long period of time without the need of constantly cleaning the battery and replacing the materials of which it is composed.

It also consists in covering the cells of the battery, thereby preventing evaporation of the materials of the battery and the corroding of the connections of the battery.

Figure 1:
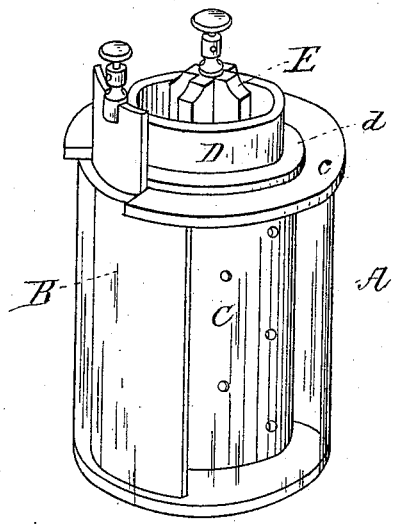
Figure 2:
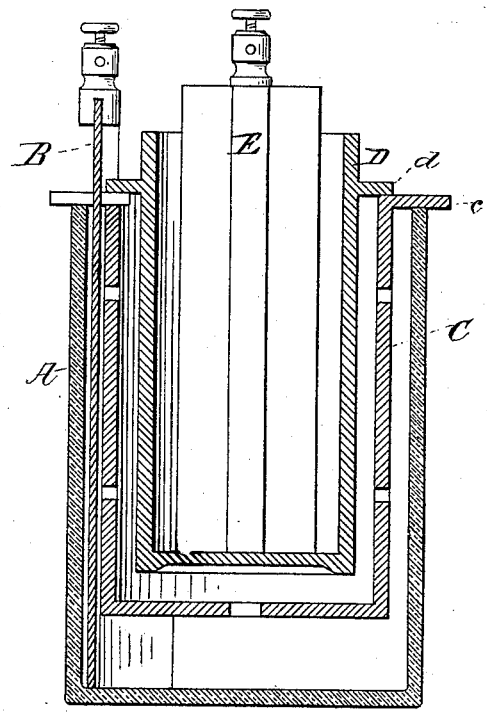

In the accompanying drawings, which form part of this specification, Figure 1 is a perspective view of a battery embodying our invention. Fig. 2 is a vertical section through the center of the same.

A is the outer jar; B, the semicircular carbon plate, having a suitable binding-screw for connecting purposes, attached to the top; C, a perforated porous cell having a flange, c; D, a porous cell having the flange d. E is an eight-faced zinc plate, having a suitable binding-screw for connecting purposes. E is the positive electrode, and B the negative electrode.

In the bottom of the outer cell, A, we put bichromate of potash in crystals, care being taken that the crystals do not come in contact with the perforated cell C. We also partially fill the cell A with dilute sulphuric acid and bichromate of potash. In the porous cup D we place free mercury, and also dilute sulphuric acid. The zinc plate E is carefully amalgamated before it is placed in the porous cup D, and a continued amalgamation is kept up by the contact of the zinc with the free mercury. The outer cell may be made of glass, porcelain, earthenware, or other suitable materials. The perforated porous cup C is made with the flange c, which enables the cup to be suspended, while the flange also acts as a cover. The porous cup D has the flange d, which also performs the same functions as the flange c. The flange d is placed a little below the top of the cup, that the top may be utilized as a handle in removing or replacing the cup.

We find that, when the crystallized bichromate of potash comes in contact with the porous cup C, upon its outer side is deposited material which soon weakens and prevents the action of the battery. We have by suspending the cell C obviated this objection. The manner and the elements of which our battery is composed afford an action of equal strength and long continuance. The ease with which any cell may be removed and replaced is of great advantage.

We are aware that bichromate of potash and sulphuric acid have been used in galvanic batteries, but not in the proportions and manner named in this specification.

We claim as our invention—

1. The combination, in a galvanic battery, of an outer cell, the perforated cell C, provided with the flange c, the porous cell D, provided with the flange d, electrodes, and appropriate fluids, substantially as described.

2. In a galvanic battery, the perforated cell C, having the flange c, whereby the cell is suspended and a cover formed, as shown and described.

3. In a galvanic battery, the porous cell D, having the flange d, whereby the cell is suspended and a cover formed, as shown and described.

In witness whereof we have hereunto set our hands.

THEODORE L. KAUFFER.
JAMES SERSON.

Witnesses:
WM. B. H. DOWSE,
GEO. Z. ADAMS.